INVENTORS
JEAN VICTOR GANZINOTTI
MAURICE DECUBBER

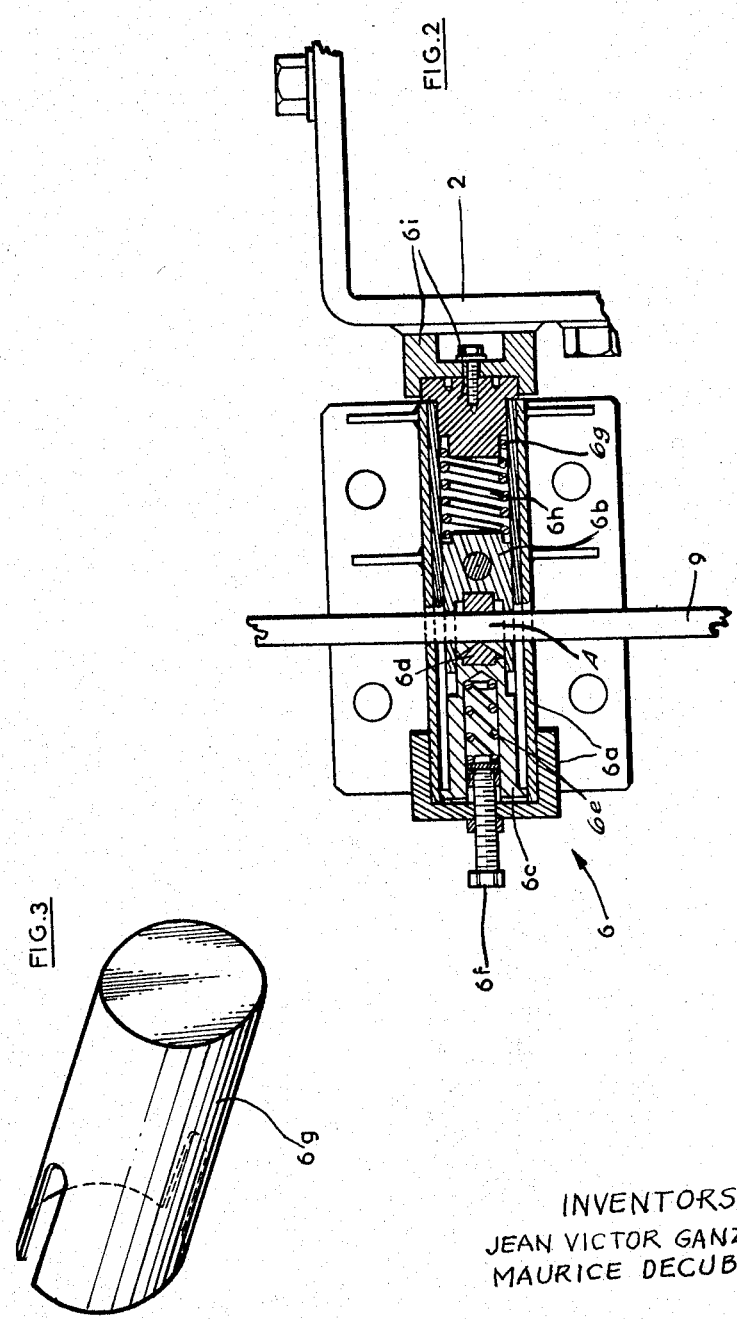

By Hammond & Littell

ATTORNEYS

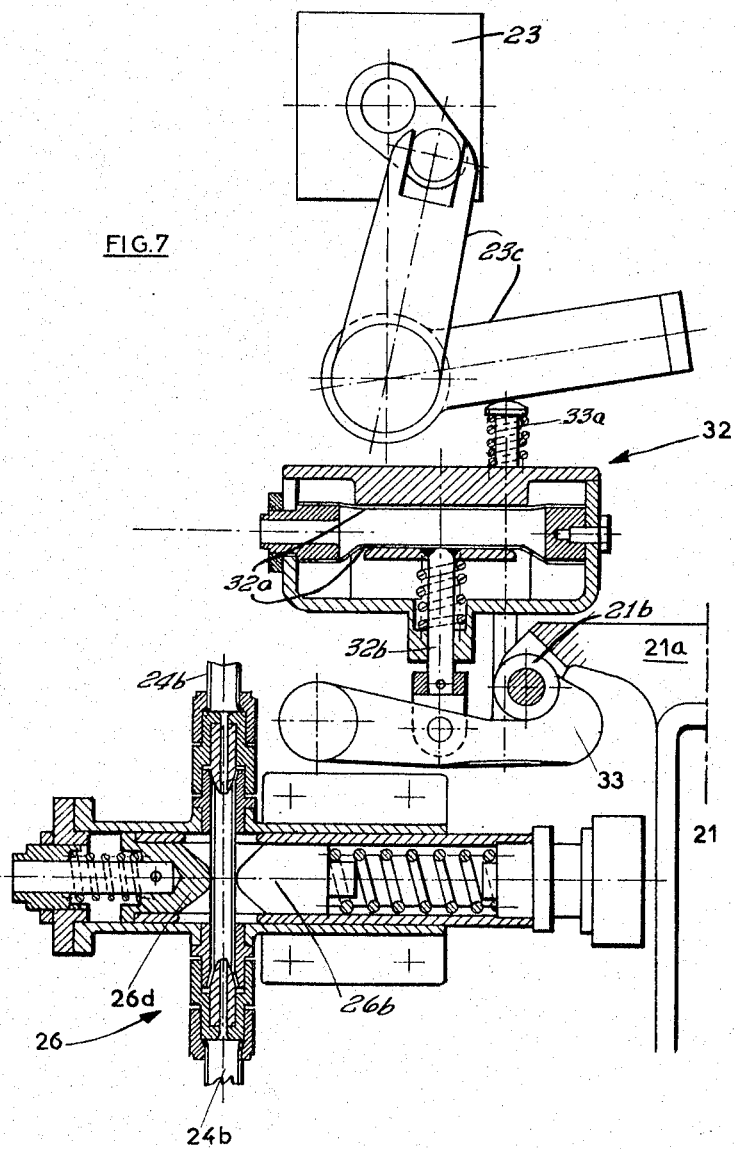

United States Patent Office 3,302,333
Patented Feb. 7, 1967

3,302,333
AIR-TIGHT DOORS EQUIPPED WITH INFLATABLE SEALS
Jean Victor Ganzinotti, Brive, and Maurice Decubber, Beaumont-sur-Oise, France, assignors to Etablissements Maille et Vagneux, Paris, France, a company of France
Filed Aug. 4, 1964, Ser. No. 387,296
Claims priority, application France, Aug. 5, 1963, 943,743; Feb. 10, 1964, 963,209
5 Claims. (Cl. 49—281)

This invention relates to air-tight doors equipped with inflatable seals.

Air-tight doors for chambers and cabinets, particularly doors of refrigerators, are already known in which air-tightness between the stationary frame or casing and the movable part of panel of the door is obtained by means of an inflatable hollow seal. Such a seal may be mounted either on the movable panel or on the stationary casing. The inflation thereof is effected by means of any suitable fluid that is not affected by the particular conditions under which the seal is used. For example, in the case of a refrigerator seal, the inflating fluid may be a liquid which is essentially non-freezable within the temperature range over which it is used.

Such doors equipped with inflatable seals, whether they are of the sliding or hinged type, are not always satisfactory. In fact, when the door is closed, it is never absolutely certain whether the seal is inflated or not. Moreover, it may happen that one begins to open the door when the seal is still inflated and this, particularly in the case of sliding doors, may very seriously damage the seal. Generally speaking, any possibility of operating the door when the seal is inflated involves the risk of causing deterioration of the seal.

Furthermore, air-tight doors which are already known and in which air-tightness is ensured by means of an inflatable seal are non-automatic, manually opened, doors.

One of the purposes of the invention is to provide for an air-tight door equipped with an inflatable seal, an apparatus for controlling the inflation of the seal and making the inflation of the seal dependent upon the position of the movable part of the door, in such manner that the closing of the movable part and the locking thereof in the closed position results in the inflation of the seal, which can be inflated only in this position of the movable part, while the deflation of the seal, under the effect of an opening control, coincides with the unlocking of the movable part of the door, or slightly precedes it.

The invention also provides for an air-tight door equipped with an inflatable seal, a control and operating assembly comprising, in combination, a source of fluid under pressure, driving means adapted to be actuated under the effect of the said fluid and which can thus cause the movement of the door panel, first transmission means enabling the fluid to be made to reach the point of inflation, second transmission means enabling the fluid to be made to reach the driving means, and control and distribution means permitting the entry of fluid into the seal only when the door is closed and permitting the entry of fluid to the driving means in the direction corresponding to the opening of the door, only when the seal is deflated.

Another feature of the invention is the production of a door equipped with an inflatable seal which is fully automatic and operates by the following method:

1. *Closing*

Movement of the door panel, the seal being deflated.
Securement of the door in the closed position, preferably by means of a fastening and locking device.
Inflation of the seal.

2. *Opening*

Deflation of the seal.
Unlocking (if necessary).
Opening movement of the movable part of the door.

Another object of the invention is the production of an air-tight door equipped with an inflatable seal in which the same fluid serves both as driving fluid for opening and closing the door and for inflating the seal.

A door equipped with the control and operating assembly according to the invention is completely reliable and economic in operation, the use of one and the same fluid for driving the door and as inflating the seal being particularly advantageous. Preferably, but not necessarily, this fluid may be compressed air.

The driving means are, for example, jacks, preferably double-acting jacks. It is also appropriate to use systems constituted essentially by a deformable tubular body interposed in a driving fluid circuit with two pinching elements fixed to the movable part of the door and which embrace the tubular elements.

Finally, it should be clearly understood that the movable part of the door may be of the hinged or sliding type, the seal may be fast with the movable part or with the frame, the fitting of this seal may be effected in any known manner (inset, semi-inset or projecting) and the cross-section of the seal may be of any form, without departing from the scope of the present invention.

Other features and advantages of the invention will appear in the course of the following description, in which reference will be made to the accompanying drawings given by way of example and in which:

FIGURE 2 shows in section a detail of the control device employed in FIGURE 1;

FIGURE 3 is a perspective view of a member of the said control device;

FIGURE 7 shows in detail, partly in section, the operating device, the locking system and the control device of the aforesaid assembly.

Figure 1:
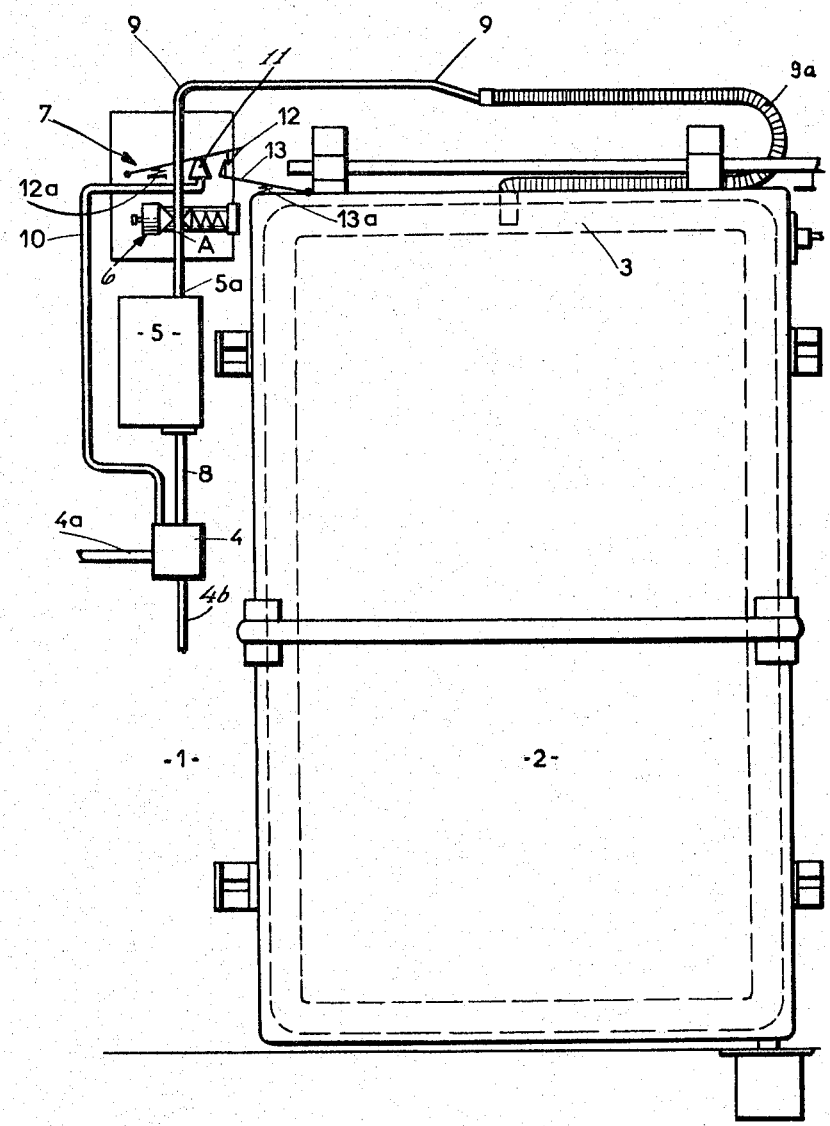
FIGURE 1 shows diagrammatically a door having an inflatable seal equipped with an apparatus according to the invention for rendering the inflation of the seal dependent on the position of the opening part of the door.

Referring to the drawings, FIGURE 1 shows diagrammatically a sliding door, the casing or frame of which bears the reference 1, while the sliding panel bears the reference 2. Between these two parts there is interposed an inflatable seal 3. The control and operating assembly according to the invention comprises a distributor 4 for fluid under pressure, an expansion device or pressure reducer 5, a control device 6 and a locking device 7.

The distributor 4 is supplied through a feed pipe 4a for fluid under pressure (for example, compressed air). Expansion device 5 communicates through a pipe 8 with the distributor 4, while outlet 5a of the expansion device communicates with the inflatable seal 3 through a flexible pipe 9. The assembly consisting of the seal 3 and the pipe 9 thus forms a variable volumetric space or chamber connected to the expansion device and can be filled with the inflating fluid at the outlet pressure of the expansion device 5. The flexible pipe 9 extends through the interior of the control device 6, which will be described in detail hereinafter and which is designed in such manner that, in any position of the door other than the closed position, the pipe 9 is pinched between two stops at a point A, which therefore prohibits any communication between the outlet 5a of the expansion device and the seal 3 and any transmission of pressure from the former to the latter. Moreover, the distributor 4 is connected by a pipe 10 to the locking device 7, which will be further described hereinafter and which is symbolized in FIGURE 1 by an inflatable chamber 11 acting on a pivoting coupling lever 12 against the action of a spring 12a, the said lever 12, co-operating on the coupling action with a second pivoting lever 13 mounted on the door panel 2 with the interposition of a spring 13a.

The operation of such an assembly will be easily understood.

From the open position of the door, with the seal deflated, closing is effected in the following manner:

The distributor 4 is actuated (manually or automatically) so as to supply the expansion device 5 at the general supply pressure 4a, the pipe 9 being pinched at A by the control device 6, thus prohibiting any transmission of the outlet pressure of the expansion device 5 to the seal 3.

The pressure passing through the medium of the pipe 10 to the locking device 7 is cut off and this restores the device to the locking position (in the diagrammatic case illustrated, the pivoting lever 12 is lowered under the action of the spring 12a, the chamber 11 being no longer under pressure).

The door panel is then brought into the closed position, which ensures locking (in the case shown in FIGURE 1, by co-operation of the coupling levers 12 and 13) and, since the said panel acts on the device 6, as will be seen hereinafter, the latter no longer compresses the pipe 9 at the point A and this permits balancing of the pressure between the outlet 5a of the expansion device 5 and the seal 3, thus ensuring the inflation of the latter.

For opening, the distributor 4 is actuated and this then no longer supplies pressure to the expansion device 5, but places the locking device under pressure and unlocks it (in the case of FIGURE 1, the chamber 11 lifts the lever 12). Seal 3 deflates as pipe 9, expansion device 5 and pipe 8 are open to the atmosphere through distributor 4 and an exhaust pipe 4b.

The slight movement of the door panel on unlocking (which, as will be seen hereinafter, may be increased by a special design of the control device 6) has the result, since the panel no longer acts on the device 6, that the latter grips the pipe 9 at A and this impedes the deflated seal 3 from being inflated whenever the door panel is unlocked.

Thus, there is inflation of the seal on closing of the door and deflation on opening, the inflation of the seal and the open state of the door, on the the one hand, and the deflation of the seal and the closed state of the door, on the other hand, being essentially incompatible. Of course, the pipe 9 joins the seal 3 by means of a flexible portion 9a of sufficient length to permit the movement of the door panel.

FIGURE 2 shows in section a detail of the control device. The control device 6 comprises a casing 6a through which the flexible pipe 9 extends. In the centre of the casing 6a there is a fixed stop 6b in contact with the pipe 9. To the left of the stop 6b a sleeve 6c carrying a movable stop 6d can slide in the casing 6a and a spring 6e tends to bring together the two stops 6b and 6d between which the tube 9 is held. The compression of the said spring 6e is adjustable by means of an adjusting screw 6f. To the right of the fixed stop 6b a second sleeve 6g (shown in detail in FIGURE 3) can slide in the casing 6a. It can be pushed into contact with the sleeve 6c in opposition to the action of a spring 6h under the effect of an assembly 6i projecting outside the system.

On closing of the door, the panel 2 pushes the assembly 6i back inside the casing and this compresses the spring 6h, pushes the sleeve 6g, which in turn pushes the sleeve 6c, and this moves the two stops 6d and 6b apart, releasing the flexible pipe 9, against the action of the spring 6e (FIGURE 2 shows the closed position).

On unlocking of the door, under the combined effect of the two springs, the assembly 6i emerges from the casing 6a, pushing the panel 2 back and thus causing the beginning of the opening of the door.

FIGURE 3 clearly shows the shape of the sleeve 6g, which is notched so that its movement does not interfere with the pipe 9.

Figure 4:
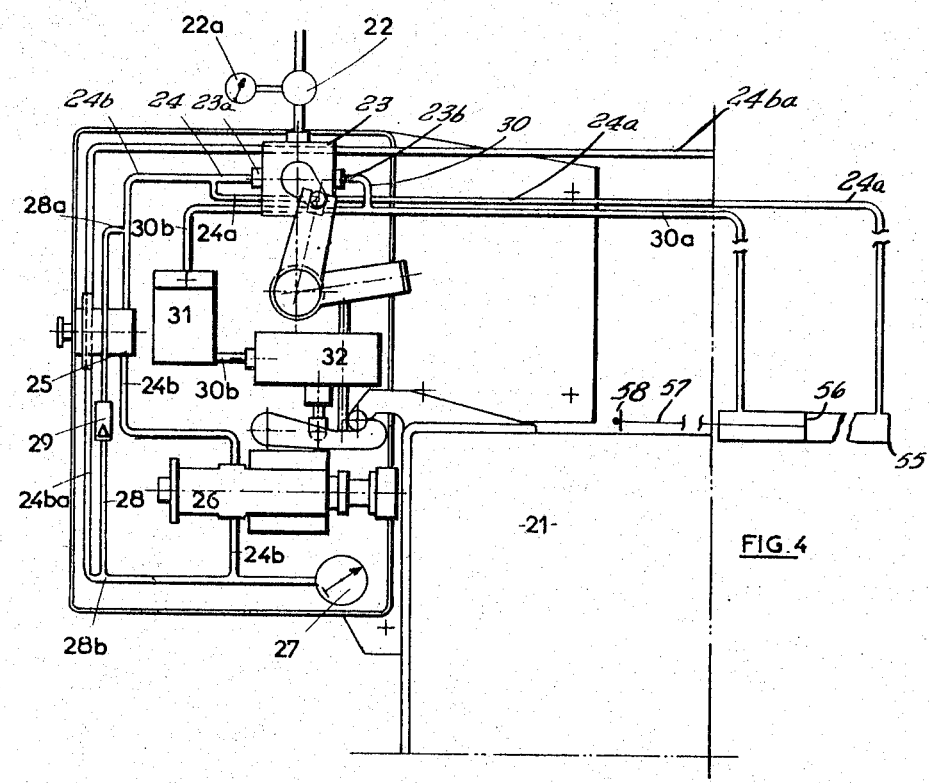
FIGURE 4 is a general diagrammatic view of a control and operating assembly according to the invention which ensures both the inflation of the seal and the movement of the door panel.

The assembly shown in FIGURE 4 and in greater detail in FIGURE 7 controls the operation of a door 21 equipped with an inflatable seal, this seal being located on the door panel or on the frame or casing of the door. The compressible fluid used for operation and for inflation of the seal, under a pressure indicated by a pressure gauge 22a, enters at 22 a distributing device 23 having two outlet channels 23a and 23b. This device is advantageously controlled manually by means of a connecting rod and crank system 23c. It can be locked in two positions enabling it to supply the channel 23a or the channel 23b respectively, the channel not supplied being systematically under discharge.

To the channel 23a there is connected the closing circuit 24 which is subdivided into a first branch 24a for actuating a closing means, such as a double acting cylinder 55 supported adjacent the door 21 and having a piston 56 reciprocally mounted therein and secured to a piston rod 57 extending from the cylinder 55 and secured to the movable door panel at 58, for the door, and a second branch 24b. This second branch 24b extends to an expansion device 25 and from there to a control device 26 permitting the flow of the fluid in the branch 24b only when the door is closed. This device, for example, is similar to the device bearing the reference 6 in FIGURE 1. It operates by pinching the second branch 24b which is constituted at least locally by a flexible tube, between two stops, a fixed stop 26b and a movable stop 26d. On leaving the device 26, the branch 24b, the internal pressure of which is measured by a pressure gauge 27, is connected to the inflatable seal (not shown) along a path 24ba. Moreover, a branch 28 is arranged in parallel with the branch 24b between a point 28a upstream of the expansion device 25 and a point 28b downstream of the device 26. A non-return valve 29 is mounted in this branch, permitting communication only in the direction 28b–28a, which can obviously take place only when the closing circuit is not under load, since, when it is under load, the pressure at 28a is higher than the pressure at 28b by reason of the presence of the expansion device 25.

From the channel 23b there starts the opening circuit 30, which is subdivided into a first branch 30a extending to an opening means (double acting cylinder 55) for the door and a branch 30b. The branch 30b extends to a delayed action device 31 which, for example, is a pneumatic delay device, the function of which is to retard sufficiently the transmission of the pressures (theoretically, a pneumatic delay device can be likened to a chamber of large volume). From the said device the branch 30b extends to an unlocking device 32.

The locking device for the door comprises, for example, a pivoting hook 33 armed by a spring 33a which always tends to cause it to rise to engage a hook 21a equipped with a roller 21b and fast with the panel of tthe door 21.

Under these conditions, the unlocking device 32 preferably comprises an inflatable chamber 32a acting on a rod 32b connected mechanically to the hook 33. The inflation of the chamber 32a carries the rod 32b downwardly and causes unlocking in the opposition to the permanent action of a spring 33a.

The operation of the device will be easily understood.

On opening (outlet 23b under pressure, outlet 23a under discharge), the valve 29 is open and the seal is deflated through the medium of the branch 28 and of the outlet 23a. Moreover, the opening means is placed under pressure. Owing to the presence of the delay device 31, the chamber 32a is placed under pressure and inflated and the door is unlocked only with a certain delay which allows the seal time to become deflated. Moreover, when the door is not closed, the device 26 pinching that portion of the circuit 24b which extends through it prohibits any untimely inflation of the seal.

On closing (outlet 23a under pressure, outlet 23b under discharge), the placing of the door in the closed position results in the locking thereof under the effect of the spring 33a, the diaphragm 32a (which is at the pressure of the outlet 23b) no longer being inflated and no longer having any opposing effect. It also causes the release of that portion of the circuit 24b which was previously pinched by the device 26 and, consequently, the inflation of the seal at the downstream pressure of the expansion device 25.

Figure 6:
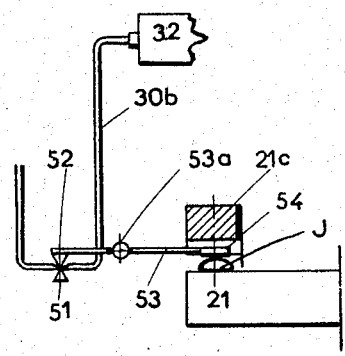
FIGURES 5 and 6 are partial views of two modified constructional forms of this assembly.
Figure 5:
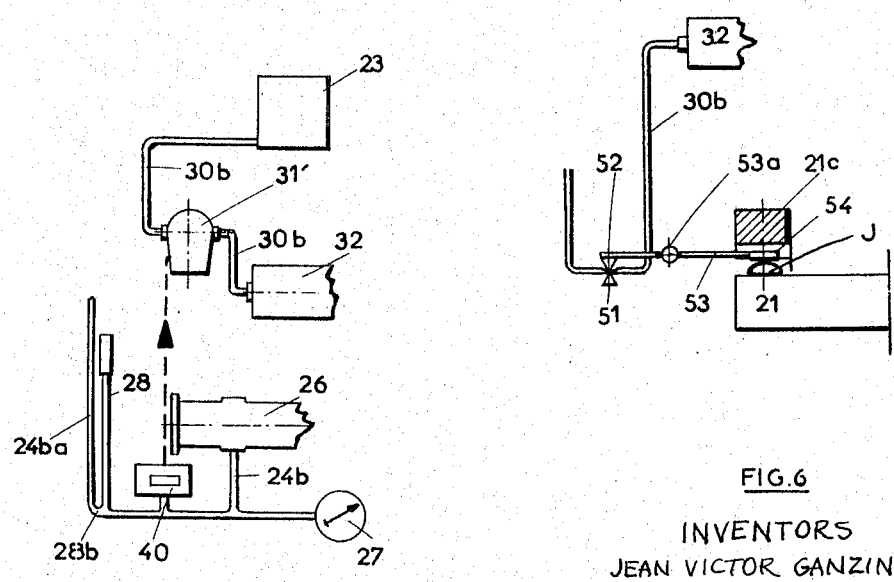

FIGURES 5 and 6 show two modified constructional forms of the slow-acting or delay device 31 referred to in the foregoing description.

In the case of FIGURE 5, this device is constituted by an electromagnetic valve 31'. This valve is controlled by a pressostat 40 mounted in the circuit 24b downstream of the device 26 and upstream of the point 28b. The pressostat 40 detects the inflation pressure of the seal and controls the operation of the valve 31' when the said pressure becomes nil or very low.

In the case of FIGURE 6, the delayed action device is constituted by two jaws 51 and 52 gripping a flexible portion of the circuit 30b upstream of the unlocking device 32. The jaw 51 is fixed; the jaw 52 is movable and associated with one end of a lever 53 pivoting about an axis 53a and the other end of which is provided with a tongue 54 which is applied against the seal J of the door 21 and follows the variations in the volume thereof.

It may be observed that this tongue 54 is advantageously placed in position in a groove in the frame or casing 21c of the door 21. Owing to this system, the two jaws can be moved apart only for a certain degree of flattening or collapse, that is to say deflation, of the seal J, and unlocking can take place only with the seal sufficiently deflated.

Finally, the opening and closing means for the door may be of any suitable type, provided that they operate under the action of a driving fluid.

Of course, the invention is not limited to the forms of embodiment which have been described but covers all variants thereof which are in accordance with its essence.

We claim:

1. For an air-tight door system, comprising a source of fluid under pressure, a movable panel, a fixed frame, a seal interposed therebetween and inflatable by said fluid, locking means biased in the lock position, and driving means actuated by said fluid for moving said panel between a closed position and an open position, an operating assembly comprising, in combination, unlocking means actuated by said fluid for unlocking said locking means, means for distributing said fluid alternatively to said seal and said fluid actuated unlocking means; means for interrupting said fluid distribution to said seal; and, extending from said distributing means, an inflating circuit leading to said inflatable seal through said interrupting means; a driving circuit leading to said driving means and an unlockng circuit leading to said fluid actuated means, whereby said interrupting means control said inflating circuit to prevent inflation of said seal except when said panel is locked into said closed position and to prevent opening of the said panel before deflation of the seal.

2. For an air-tight door system comprising a source of fluid under pressure, a movable panel, a fixed frame, a seal interposed therebetween and inflatable by said fluid, a locking means biased in the lock position and driving means actuated by said fluid for moving said panel between a closed position and an open position, an operating assembly comprising, in combination, unlocking means actuated by said fluid for unlocking said locking means; means for distributing said fluid alternatively to said seal and said fluid actuated unlocking means; means for interrupting said fluid distribution to said seal comprising a fixed jaw and a movable jaw; and, extending from said distributing means, an inflating circuit leading to said inflatable seal through said interrupting means and comprising at least one flexible pipe member between said fixed jaw and said movable jaw; a driving circuit leading to said driving means and an unlocking circuit leading to said fluid actuated unlocking means, whereby said pipe member is pinched between said jaws for interrupting said inflating circuit thus preventing inflation of said seal except when said movable jaw is released from pinching said pipe by said panel coming into locked and closed position.

3. For an air-tight door system comprising a source of fluid under pressure, a movable panel, a fixed frame, a seal interposed therebetween and inflatable by said fluid, a locking means biased in the lock position, and driving means actuated by said fluid for moving said panel between a closed position and an open position; an operating assembly comprising, in combination, unlocking means actuated by said fluid for unlocking said locking means; means for distributing said fluid alternatively to said seal and said fluid actuated unlocking means; means for interrupting said fluid distribution to said seal comprising a fixed jaw and a movable jaw; a delayed action device interposed between said distributing means and said unlocking means, and extending from said distributing means, an inflating circuit leading to said inflatable seal through said interrupting means and comprising at least one flexible pipe member between said fixed jaw and said movable jaw; a driving circuit leading to said driving means and an unlocking circuit leading to said fluid actuated unlocking means, whereby said pipe member is pinched between said jaws for interrupting said inflating circuit thus preventing inflation of said seal except when said movable jaw is released from pinching said pipe by said panel coming into locked and closed position, and whereby said delayed action, on opening, delays unlocking of said panel to allow time for said seal to deflate.

4. An operating assembly according to claim 3, wherein said driving circuit comprises an opening circuit and a closing circuit, and wherein said distributing means comprises an inlet for said fluid, a first outlet connected to said unlocking circuit and said opening circuit, a second outlet connected to said inflating circuit and said closing circuit, one of said outlets being selectively under discharge when other said outlet is under pressure.

5. An operating assembly according to claim 3, wherein said unlocking means comprises an inflatable chamber actuated by said fluid to unlock said panel when under pressure.

References Cited by the Examiner

UNITED STATES PATENTS 1,633,267   6/1927   Nelson _____ 60—51

FOREIGN PATENTS 448,070   4/1948   Canada.

REINALDO P. MACHADO, Primary Examiner.

KENNETH DOWNEY, HARRISON R. MOSELEY, Examiners.